United States Patent [19]
Adams

[11] Patent Number: 5,836,636
[45] Date of Patent: *Nov. 17, 1998

[54] GOODS STORAGE

[76] Inventor: William Mark Adams, Sutton Lodge, 33 Town Street, Sutton-cum-Lound, Retford, England

[ * ] Notice: This patent issued on a continued prosecution application filed under 37 CFR 1.53(d), and is subject to the twenty year patent term provisions of 35 U.S.C. 154(a)(2).

[21] Appl. No.: 373,188

[22] PCT Filed: Jul. 19, 1993

[86] PCT No.: PCT/GB93/01515

§ 371 Date: Jan. 17, 1995

§ 102(e) Date: Jan. 17, 1995

[87] PCT Pub. No.: WO94/02337

PCT Pub. Date: Feb. 3, 1994

[30] Foreign Application Priority Data

Jul. 18, 1992 [GB] United Kingdom ................. 92154324

[51] Int. Cl.[6] ........................................... B60P 3/05
[52] U.S. Cl. ................... 296/24.1; 296/181; 414/679; 414/495; 414/507
[58] Field of Search ................... 296/181, 24.1, 296/182, 183; 105/370; 414/540, 541, 542, 545, 544, 679, 495, 507; 410/24, 26, 27, 29.1

[56] References Cited

U.S. PATENT DOCUMENTS

| 3,006,485 | 10/1961 | Martin | 414/542 |
|---|---|---|---|
| 3,516,706 | 6/1970 | Bruce | 296/24 |
| 3,591,246 | 7/1971 | Adams | 312/306 |
| 4,642,018 | 2/1987 | Leroux et al. | 414/502 |
| 4,887,328 | 12/1989 | Apgar | 414/541 |

FOREIGN PATENT DOCUMENTS

| 2528398 | 12/1983 | France . |
|---|---|---|
| 2586976 | 3/1987 | France . |
| 2305792 | 8/1974 | Germany . |
| 2324858 | 12/1974 | Germany . |

*Primary Examiner*—Joseph D. Pape
*Attorney, Agent, or Firm*—Head, Johnson & Kachigian

[57] ABSTRACT

The invention relates to the provision of movable floors in a storage area and to the solution of the problem with conventional floors wherein the capacity of said storage areas are not utilised due to inaccessible areas or the machinery required to provide existing movable floors. The invention is of particular use in trailers or trucks for road or rail movement. The invention provides at least one frame (54) which forms a goods lifting and storage base, said frame supported by a series of first guide (10) means and, in one aspect said first means are mounted on a series of second guide means (56). At least one frame provided is capable of movement in relation to at least one of the guide means provided to ensure that goods can be moved into previously inaccessible areas. The formation of the guide means also ensures that minimum space is lost due to the provision of the movable frames.

12 Claims, 7 Drawing Sheets

GOODS STORAGE

The invention of this application relates to improvements in the loading and unloading of goods in a goods storage area whether the goods are in transit or in a warehouse. Typically, although not exclusively, the invention will be used in trailers or trucks for the transport of goods, but reference hereto will not be taken to exclude any other storage area. The invention leads to improvements in the storage capacity of said storage areas. The invention provides a system for an adjustable floor or series of floors which will be movable in relation to the storage area.

Typically vehicle trailers or trucks, whether they be road or rail trailers or trucks are used to carry articles which, when carried, do not fill the trailer or do not properly fit into the trailer. Alternatively, trailers and trucks are built to a cubic capacity which enables safe loading but which falls short of the designed carrying capacity of the vehicle. This is due typically to difficulties encountered in the loading of said goods into the trailer or truck and stacking said goods when they are in the trailer itself. When attempting to stack goods problems are encountered in safely stacking the goods and also preventing damage to said goods. It is therefore commonly the case that conventional vehicle trailers or trucks, although carrying the maximum possible load, have unused space left therein due to the inability to stack the goods in that space whether due to safety or size restraints. This is a problem which has been attempted to be solved by the use of scissor lifts let into the floor of the lower deck. A further problem is encountered in those trailers or trucks which incorporate a step at the front of the trailer to utilise the space available above the vehicle and trailer coupling. The main problem involves lifting the goods onto this stepped area and it Is found that this area is on occasion not used due to these difficulties.

Furthermore it is evident that current lifting and goods moving requirements lead to the human loaders undertaking tasks which are in contravention of increasingly stringent Health & Safety requirements. At present up to 17 million working days are lost through back injury caused by bad lifting techniques, and companies which operate goods storage and transporting facilities are increasingly accountable for non-compliance of the correct loading practice.

As a result of these problems several solutions have been used. The first is to provide a second deck inside the trailer or truck which provides in effect two loading floors. This has been found to be effective in relation to the transport of white goods such as washing machines, but problems have been found in that although the stacking of goods is improved due to the provision of the second loading surface the same shape and size constraints and loading requirements still apply and optimum loading is not achieved. Further, the level of adaptability of the two deck arrangement is insufficient and also the requirement to load goods onto the top deck can be both time consuming and dangerous to the loaders by the use of external unguarded tail lifts at excessive heights.

A further development has been the provision of hydraulic ram operated movable floors. These floors are provided such that the goods can be lifted onto the floor and the floor subsequently moved upwardly toward the top of the trailer to leave a second, commonly fixed, floor thereunder upon which further goods can be loaded. Problems encountered with this method of loading are that each of the moving floors requires a hydraulic ram and therefore the machinery required to provide said moving floors with the ram located under the floor is bulky and the use of hydraulic systems in relation to certain goods is not desirable and is of further disadvantage due to ineffective security locking.

Other known systems include that disclosed in DE 2740034 which discloses a cattle truck which comprises the provision of a fixed floor and two intermediate floors, each of which is movable. However, in this case it is only possible to move the floors as a single unit along the length of the storage area and there is no. possibility of altering the levels of parts of each floor. German patent 2902918 relates to the provision of a lifting floor wherein the lifting floor can be used to rove animals upwardly from the base floor but again the floor along the length of the goods storage area is required to be moved as a whole. There is no disclosure of a plurality of bases being used and each of the same being independently movable to form either a whole floor along the length of the goods storage area at the same level or a plurality of floors at various levels along the length to suit the goods to be transported. This lack of ability to adapt the height of individual parts of each floor means that it is not possible to configure the storage system to suit goods of different sizes which may all be required to be stored in the storage area. French patent 2530201 discloses the provision of a lifting floor at the end of the goods storage area which can be used to lift products from a base floor to a second, fixed level floor, at a higher level, so that the goods can be off loaded from the lifting floor and then moved along the second fixed level frame. Once again there is no disclosure of the level of the elements of the second floor being movable.

The aim of the present invention is to provide a movable goods support system for supporting goods in a storage area, said system designed to be adaptable and to be easy to use thereby allowing the optimum use of the storage space available.

The present invention provides in a first aspect, a goods support system for use in a goods storage area, said system comprising a plurality of goods supporting bases and sets of guide means therefore, each of said bases located on a set of guide means and movable along said guide means and characterised in that said bases and sets of guide means are arranged along at least a section of the goods storage area so that the bases can be moved to form a multilevel goods support system along the section.

Each set of guide means has at least one base located thereon, said sets of guide means arranged along the section of the goods storage area such that, in one position, when a base on each set of guide means is moved to a common level, a goods support system in the form of a goods support floor of uniform level is formed along the length of the section of the storage area.

In one embodiment at least two bases are mounted on a common set of guide means and preferably each of the said bases are independently movable along the common set of guide means.

Typically the set of guide means are mounted in a substantially vertical plane.

In a second aspect of the invention there is provided a goods support system for use in a goods storage area, said system including at least one base mounted on a plurality of guide means forming a first set of guide means characterised in that said base is movable along said first set of guide means and said base and/or guide means are movable in a perpendicular direction to the movement of said base along the first set of guide means.

In one embodiment the first set of guide means are provided for movement along a second set of guide means in said perpendicular direction.

Typically one of the first or second sets of guide means are mounted in a substantially vertical plane and the other set of guide means is mounted in a substantially horizontal plane and at least one base is movable along the first set of guide means and said first set of guide means is mounted for movement along said second set of guide means.

This therefore provides that at least one base is capable of movement within the goods storage area in vertical and horizontal planes along said first and second sets of guide means and preferably the movement of the base along a set of guide means in a substantially horizontal direction is achieved by powered or manual drive.

For manual drive the base is mounted on the first set of guide means, said guide means having banks of rollers or skates thereon and said rollers or skates are arranged to engage and pass along the second set of guide means mounted in a substantially horizontal plane.

Typically the second set of guide means are mounted on the floor of the goods storage area.

In either aspect, movement of the base relative to a set of guide means arranged in a substantially vertical plane is powered.

Typically at least one of the guide means in a set includes a drive means locator and said system is provided with drivable means to engage with the drive locator to cause said base to rise or lower.

In one embodiment at least one of said guide means includes a hydraulically powered ram mounted within the guide means to connect with the base for movement of the same.

In a further embodiment at least one of said guide means include drive means locators for the passing of cable or rope lengths thereabout such that the drive means drives the same to move the base connected thereto in the desired direction.

Alternatively said drive locators are in the form of rack members and the rack members are shaped lengths of plastics or metal materials and include a plurality of spaced indents along the length thereof or alternatively are lengths of chains mounted along the length of the guide means.

Preferably the rack members ac in conjunction with pawls provided on the base, said pawls acting, when driven, as means for driving the base along the rack member and, when not driven, as means for locating the base at a particular position on the said rack member.

Typically the pawls act as a safety lock when not powered to prevent movement of the base when the pawl is not powered.

Typically the drive means provided for any one base are controllable to drive and move the base at a uniform speed thereby maintaining the base in the desired plane.

In one embodiment the drive means provided to drive the base along the guide means is provided on the base and connected to the guide means via a central drive shaft to which is linked a series of link shafts, each of said link shafts connected for rotatable movement and connected with the drive means locators on the guide means and in one embodiment the central shaft is driven by an electric motor.

It is preferred that the guide means are mounted on or adjacent to the side walls of the storage area and typically the storage area is provided in a trailer or truck for road or rail transport.

A specific embodiment of the invention will now be described with reference to the accompanying drawings wherein.

Figure 1:
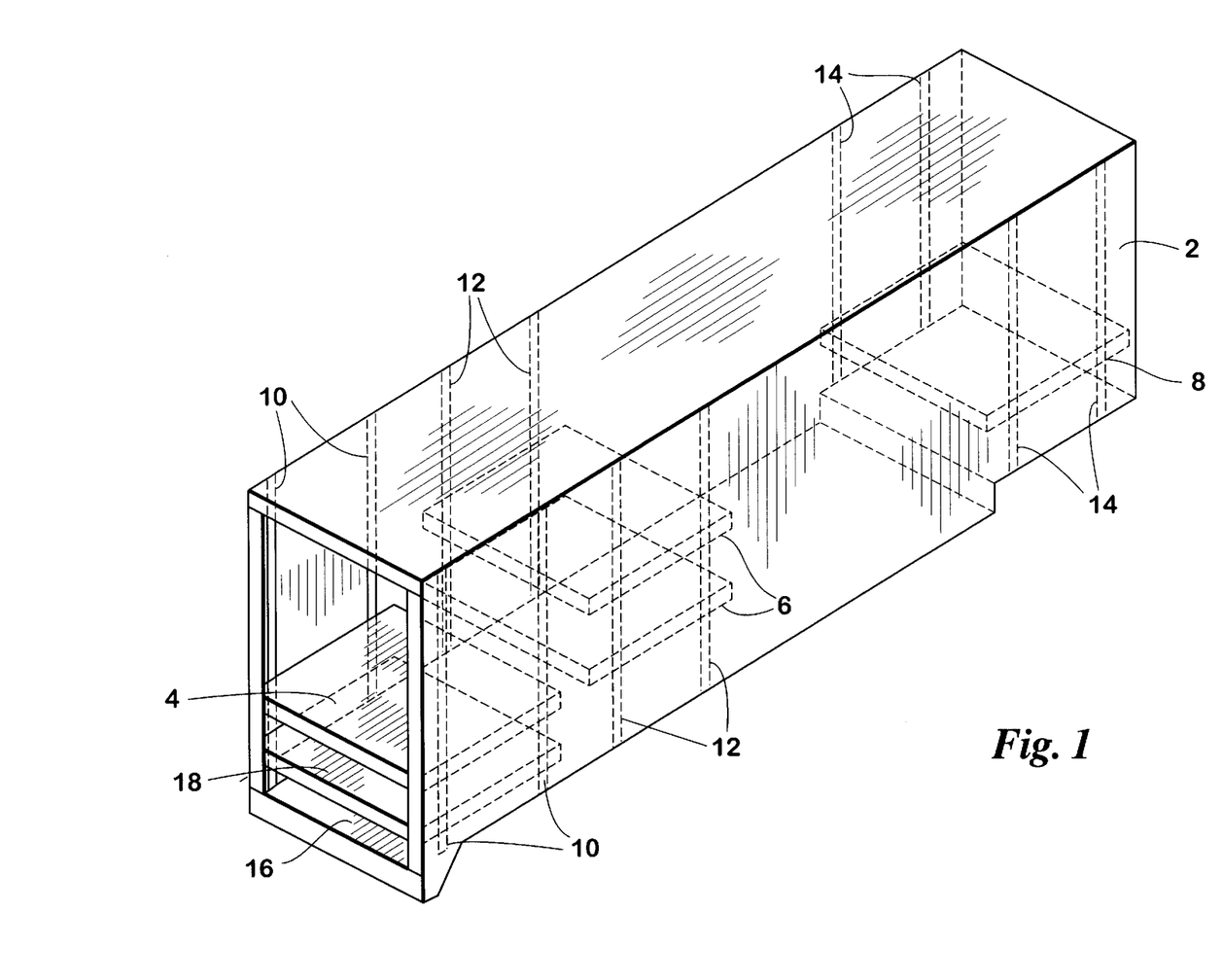
FIG. 1 relates to a diagrammatic perspective view of a typical goods trailer or truck with one embodiment of the goods support system of the invention fitted therein.

Referring firstly to FIG. 1 there is shown a typical trailer or truck 2 for the road transport of goods. Said trailers are used to carry a wide range of goods. A first embodiment of the goods support system of the invention is shown which comprises a series of frames 4, 6 and 8 mounted in engagement with a first set of guide means 10, 12 and 14. Each of the said frames are movable, independently, in a vertical direction along the said first guide means. As can be seen the frames 4, 6 and 8 can be moved to, and maintained at, varying heights dependent upon the goods to be carried thereon and also the goods to be carried on the floor 16 of the trailer or on a second movable frame 18 mounted on the same guide means as frame 4 but underneath same.

Figure 2:
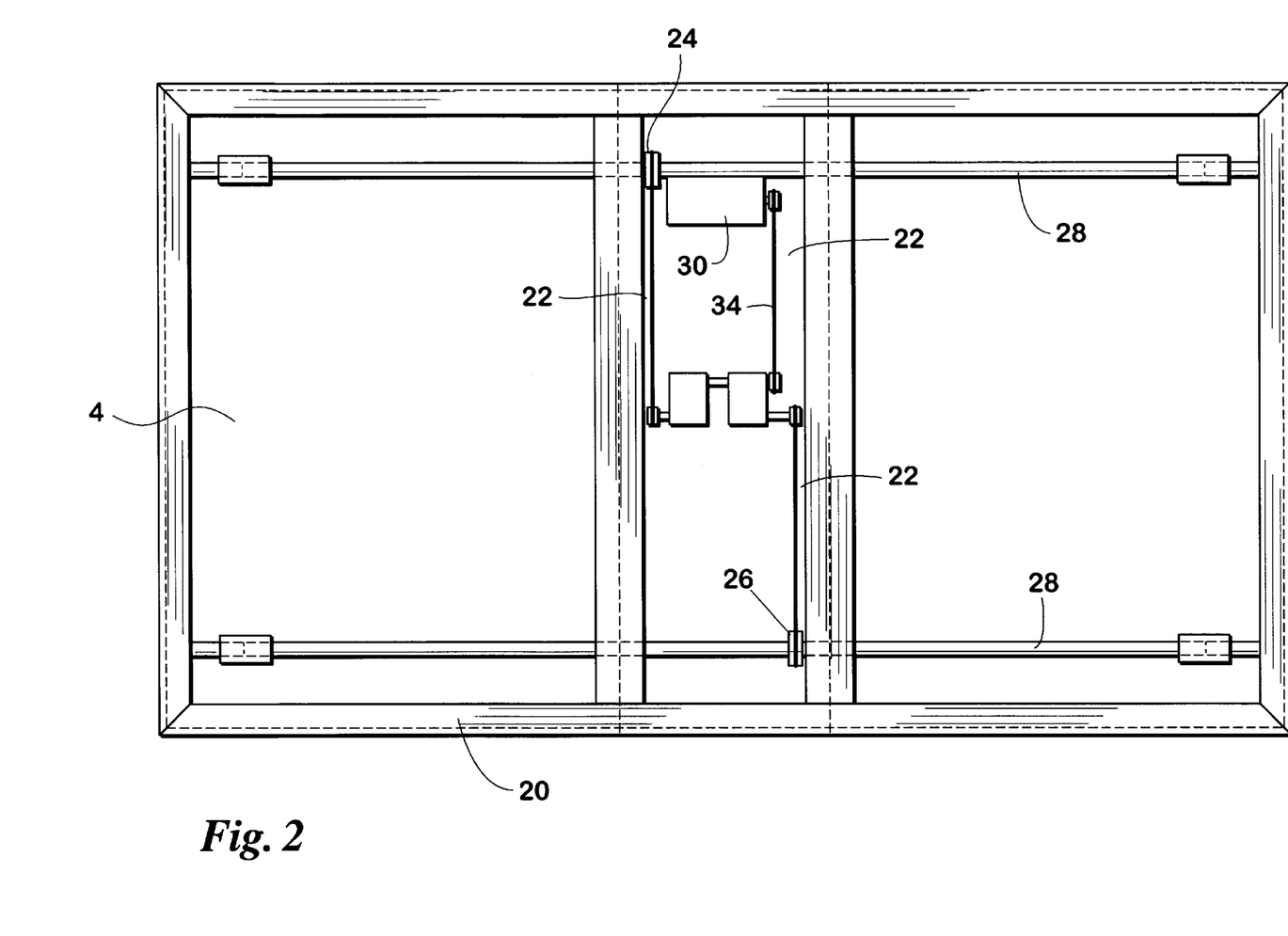
FIG. 2 shows a plan view of the drive system for a frame of the goods support system.

Referring now to FIG. 2 there is shown, in simplified detail, one of said frames 4. Typically, although not shown, the guide means will be fastened or moulded into the walls of the trailer and will be unobtrusive. The frame 4 comprises a square or rectangular steel frame 20 in which is mounted central drive connection 22. Said connections are linked by standard coupling arrangements at 24 and 26 to link shafts 28. The link shafts are in turn coupled to drive pawls which in turn are in engagement with rack members provided in the guide means. Thus, rotation of the shafts, in this instance by motor 30, serves to produce the direction of rotation of each of the pawls connected to a link shaft 28 and hence the frame is moved up or down the rack members of the guide means. Typically the rack members can be formed from a moulded length of plastics or metal or by a length of standard chain as represented at 34. Alternatively, a pulley arrangement, or hydraulic ram, running within the guide means can be used.

Figure 3:
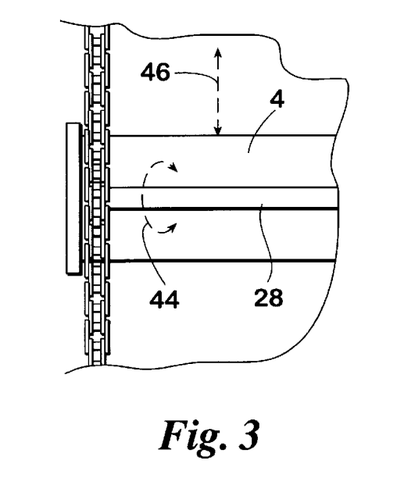
FIG. 3 shows in elevation one embodiment of a movable rack and pawl arrangement as used in FIGS. 1 and 2.
Figure 3A:
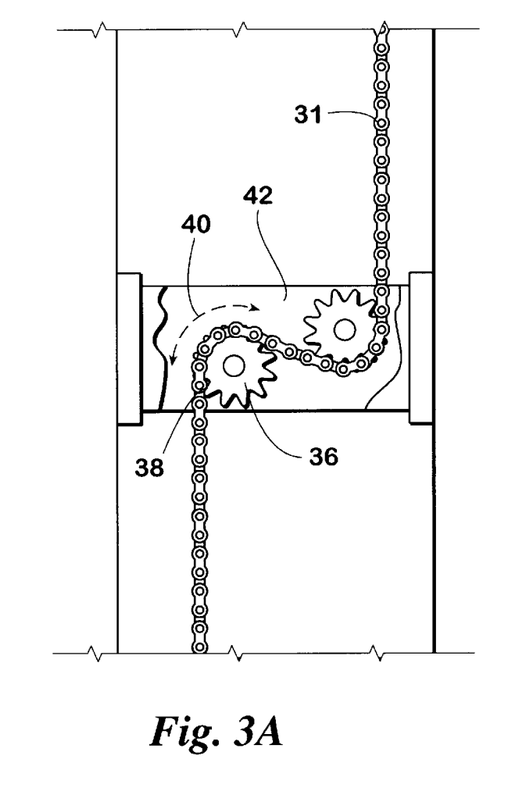
FIG. 3a shows the arrangement of FIG. 3 in end elevation.

FIGS. 3 and 3a shows in greater detail a typical rack and pinion or pawl system as used with this first embodiment. Shown is part of a rack member 31 in engagement with teeth 36 of a pinion or pawl wheel 38 which is mounted to rotate around its axis as represented by arrow 40. The coupling arrangement is standard and will be contained in a sealed unit 42 which, for the purposes of this description is shown partly cut away. The pinion 38 is turned by rotation in direction 44 of the link shaft 28. The turning of the link shaft 28 therefore provides movement of the frame 4 in the direction 46 upward or downward dependent upon the direction of turn of the shaft.

Figure 4:
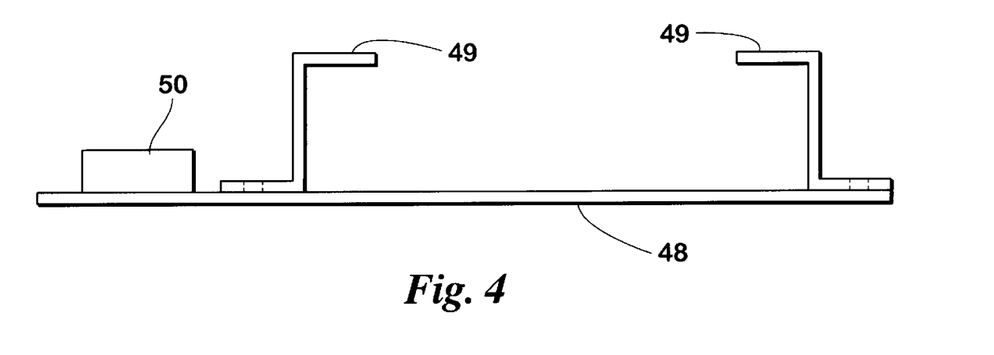
FIG. 4 shows a plan view of a first guide means.

FIG. 4 illustrates a plan view of a guide means 10 of the first embodiment with the drive means omitted wherein the guide means include a base plate 48 upon which is mounted two shaped plates 49 which define a guide within which the drive means locator and drive means and pinion wheel 38 move. Also provided is a series of protrusions 50 which engage with a spring loaded lever (not shown) mounted on the frame. This lever is biased downwardly against each protrusion to act as a lock should the drive fail and to prevent any downward movement of the frame without first withdrawing said levers.

Figure 5:
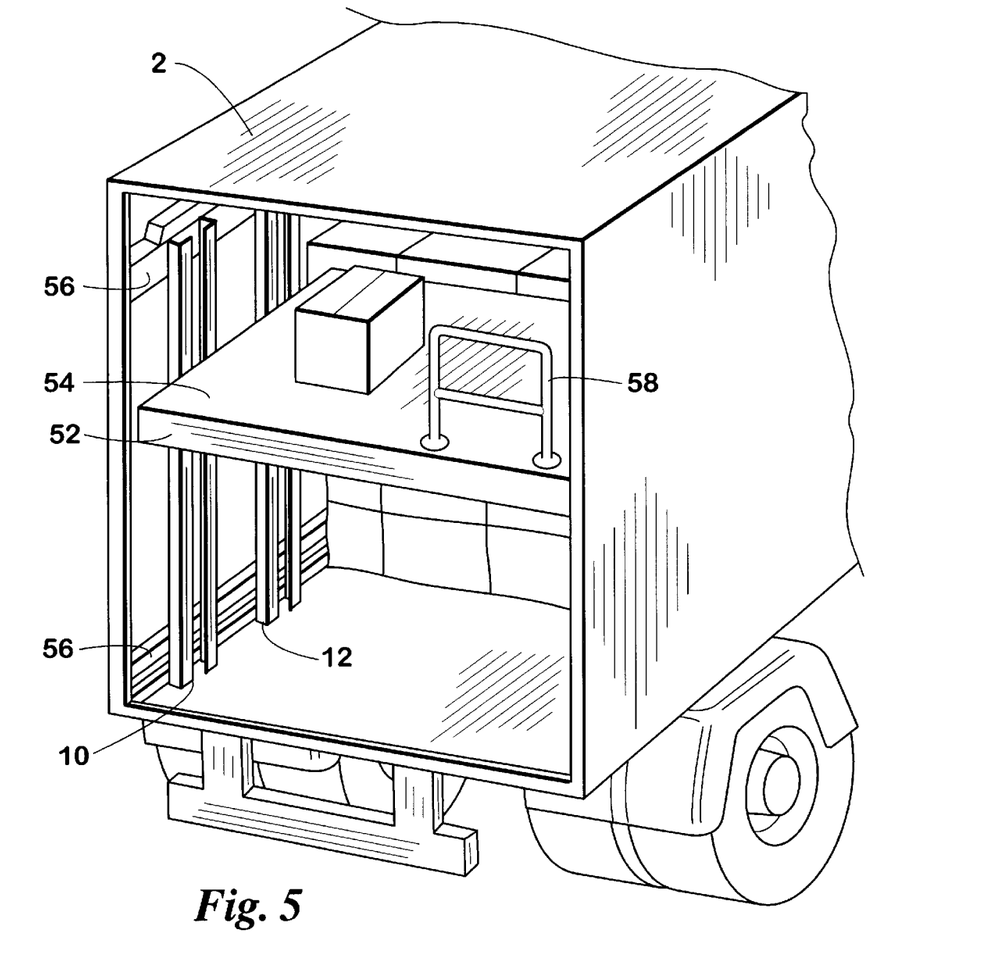
FIG. 5 shows a perspective view of a second embodiment of the goods support system.

FIG. 5 illustrates a second embodiment of the invention wherein there is incorporated within the storage area of as trailer a movable goods support system 52 with at least one frame 54 which is mounted on a first set of guide means 10 and 12 with 14 and 16 (not shown) which allow vertical movement of the frame 54. Furthermore the first guide means are mounted on a second set of guide means 56 which in this case are mounted on the side walls of the trailer 2. These second guide means are disposed such as to allow horizontal movement of the first guide means and hence the goods support frame 54, along the length of the trailer. Thus there is now provided a goods system 52 which is capable of vertical movement and horizontal movement within the goods storage area. Typically for safety measures the goods support frame 54 is provided with one or a plurality of safety fences 58 which are particularly appropriate when the frame is near the top of the trailer. These fences are fitted primarily to give loaders increased safety and comfort whilst stacking the vehicle and also to retain the load mounted on the frame during travel.

Typically there is also provided, although not shown in this instance, a locking means which ensure that the first guide means can be locked in position in relation to the second guide means and also that the frame 54 can be locked in position in relation to the first guide means hence providing a safe but movable goods system. From experience it has been found that powered drive of the frame 54 in relation to the first guide means 10 and 12, 14 and 16 in the vertical direction by any of the drive means as previously described with reference to the first embodiment is most appropriate but that the provision of a series of rollers on each the first guide means in engagement with the second guide means provides adequate and efficient movement by manual movement of the first guide means in relation to the second guide means.

Figure 6:
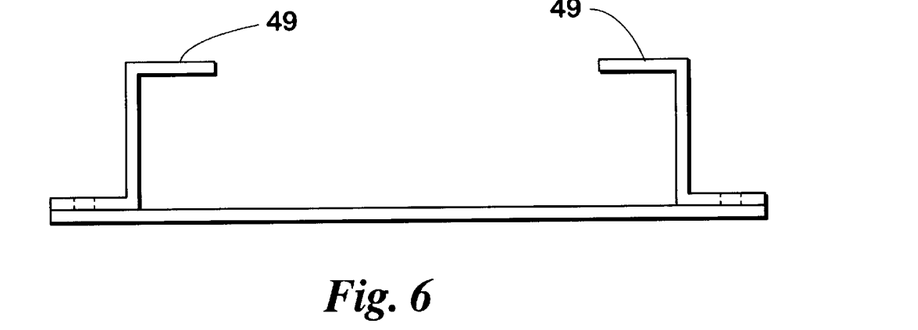
FIG. 6 shows a plan view of the first guide means as used in FIG. 5.

FIG. 6 illustrates a plan view of the first guide means as used in this embodiment of the invention wherein it can be seen that the guide means are again formed by two shaped plates 49 but in this case the protrusions 50 have been removed. This is not always the case and these can be included if required.

Figure 7:
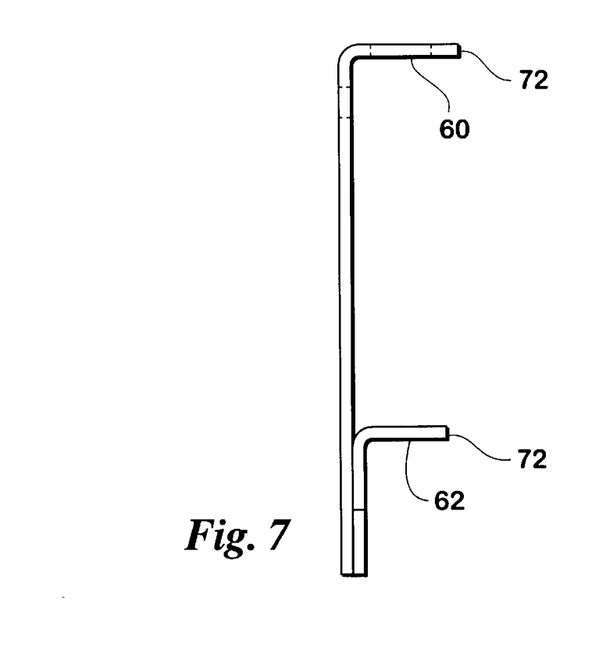
FIG. 7 shows an end elevation of the second guide means as used in FIG. 5.

FIG. 7 illustrates a typical end elevation of a second guide means wherein it can be seen that the said guide means is formed of two plates 60 and 62 which in combination provide a guide along which the rollers of the first guide means can move.

Figure 8:
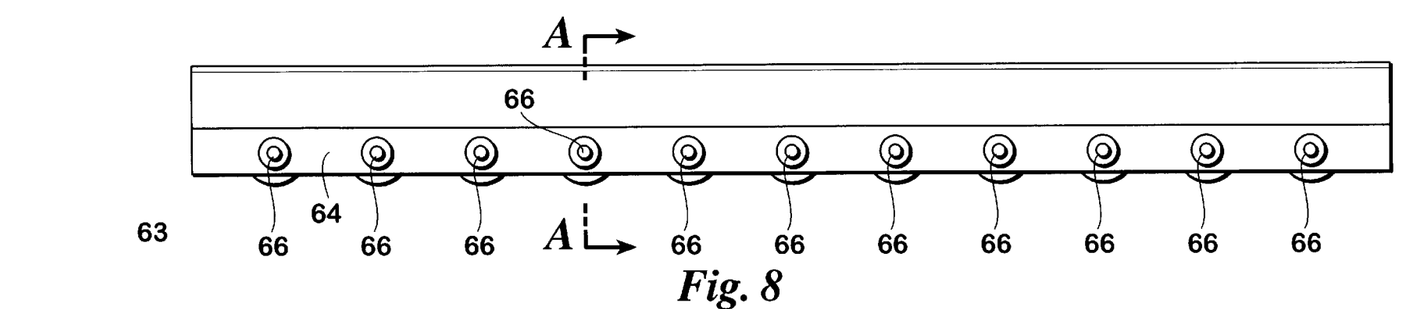
FIG. 8 shows a roller support means for use in association with a second guide means mounted in the floor of the area.

FIG. 8 shows a mounting 64 for a series of rollers which is provided in engagement on each of the first guide means and each of the axis 66 of the series of rollers on the mounting are shown. Said mounting therefore is disposed in a first guide means to pass along the second guide means as shown in FIG. 7 and thereby provide movement of the first guide means in relation to the second guide means. In one particular application the mounting 64 comprises an alloy extrusion 63 which, in an embodiment for carrying heavy weights is provided adjacent to a second guide means (not shown) which is fitted into the floor. The rollers 68 or skates in the mounting 64 are therefore provided to pass along the path of the guide means in the floor. This particular embodiment ensures that heavy weights can be lifted and moved on the goods support frame.

Figure 9:
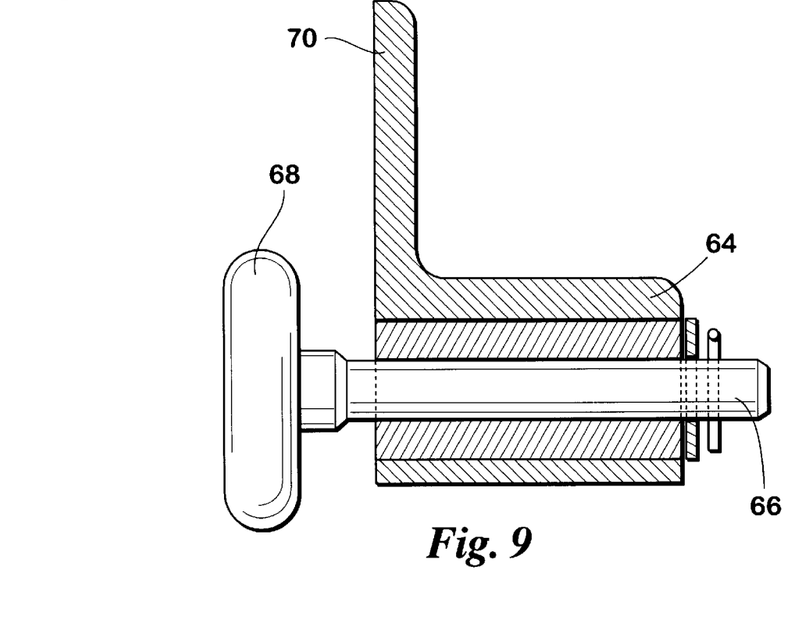
FIG. 9 illustrates a cross sectional elevation along line A—A of FIG. 8.

FIG. 9 illustrates a cross section through line A—A of FIG. 8 of such a mounting of rollers and here one of the rollers 68 can be seen to have its axis through the support mounting 64 with the axis 66 passing through the said mounting. The roller 68 will lie within the second guide means of FIG. 7 with the wall 70 of the mounting abutting with the edges 72 of plates 60 and 62 of FIG. 7 to maintain the rollers within the guide means.

It is also possible that, if required the frame can be fixed in relation to the first set of guide means and only movable in relation to the second set of guide means by movement of the first guide means along the second guide means. Alternatively the frame can be directly linked to the guide means in the horizontal plane for movement therealong.

Figure 10A:
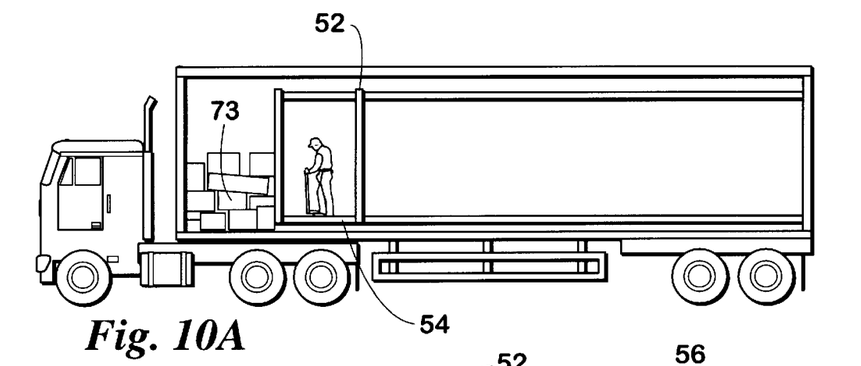
FIG. 10 shows an elevation of a method of loading a trailer of an articulated vehicle using the invention.

FIGS. 10A,B,C,D and 11 indicate two methods of loading and unloading a vehicle using the movable goods storage system of the second embodiment of the invention. Although not shown, this second embodiment can be used in conjunction with the movable goods system of the first embodiment thereby providing an integrated and movable goods support system which allows optimization of the storage area.

Figure 10B:
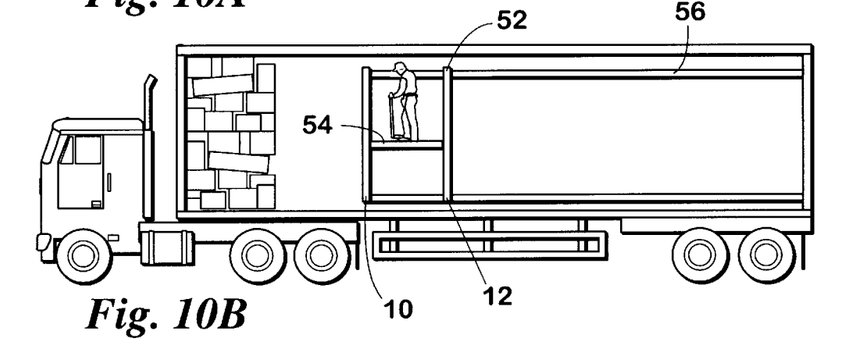

Referring firstly to FIG. 10A there is shown the trailer of an articulated vehicle in the initial stages of storage of goods. As can be seen the goods 73 to be stored are of a random size and nature and therefore it is extremely difficult to predict and provide fixed goods storage floors which can accommodate all different sizes of articles. It is in situations like these that the present invention is of particular benefit. The goods storage system 52 is shown having been moved to the end of the vehicle with the frame 54 at its lowest point. As the goods are placed into the trailer so the space is filled and the operator is required to be moved towards the rear of the trailer and does so as indicated in FIG. 10B wherein the operator can push the system along the second guide means 56 to the required position and can also if necessary raise the frame 54 on the first guide means 10 12, (14, 16, not shown) to the level which is most appropriate for placing the goods on those goods already in place. Typically movement of the first guide means in relation to the second guide means will be by physical pushing or pulling of same but can equally be powered if this is more appropriate and the vertical movement of the frame 54 in relation to the first guide means is by powered arrangement. In all cases it is envisaged that the powered drive will be controlled by a hand held control system of conventional means which will be connected to the drive by flexible cabling and will allow operation of the goods system by the operator without needing to go to a fixed control point.

Figure 10C:
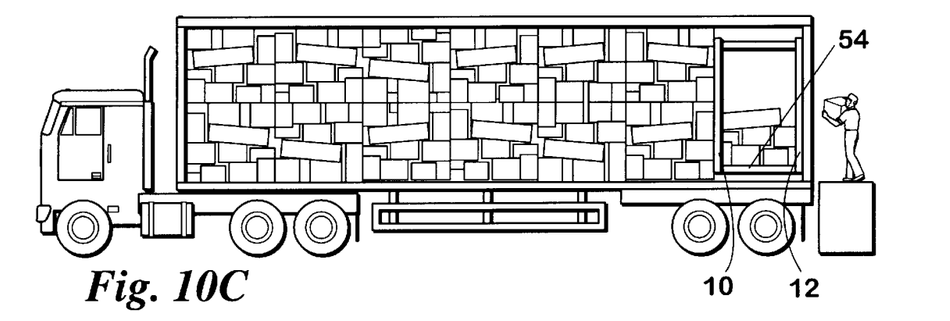
Figure 10D:
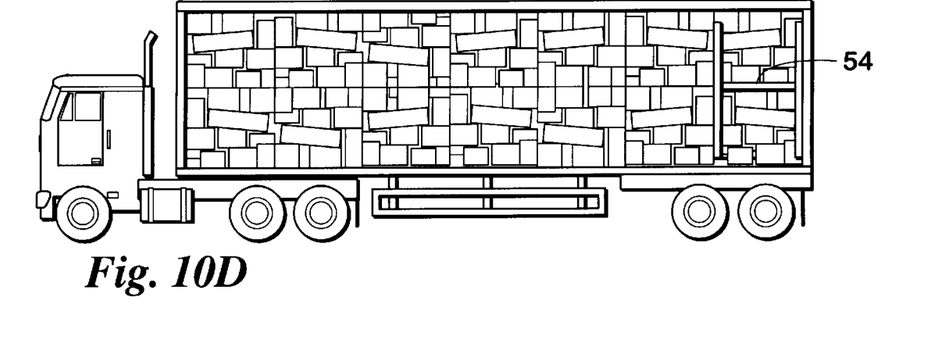

FIG. 10C illustrates the condition wherein the trailer has been substantially filled and illustrates the fact that the goods system even when it cannot be moved in a horizontal direction can still be used to provide maximum use of the space available. In FIG. 10C there is shown the operator external of the storage area filling the frame 54 with further goods. When the goods have reached a certain height the frame can then be lifted on the first guide means so as to leave exposed a space underneath the frame 54 as shown in FIG. 10D which can be filled with further goods 73 thereby utilizing the space above the frame 54 and below the same. Typically the goods stored at the end will be those which are to be unloaded first.

Figure 11:
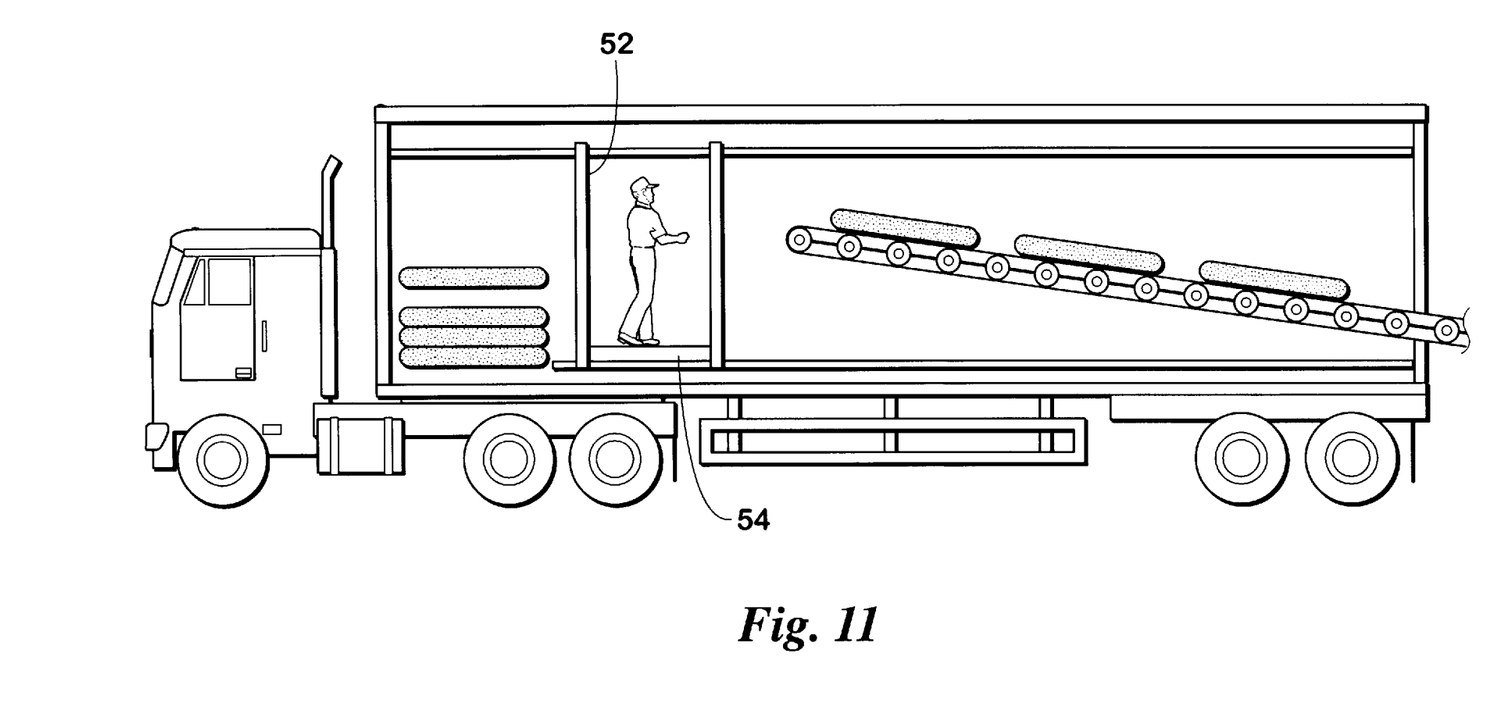
FIG. 11 illustrates an elevation of an alternative method of unloading a trailer of an articulated vehicle using the invention.

FIG. 11 illustrates a trailer for the storage of mattresses for beds which are of a more standard size and again the goods system of the invention can be utilized to advantage. In this case the goods system 52 is used and provided on the step of the trailer which previously could not easily be used and by raising and lowering the goods system frame 54 so the mattresses can be removed with ease by the operator and in this case placed on a conveyor system which is angularly displaced to provide the movement of the mattresses from the inside of the trailer to external of the trailer for unloading. Again there is provided first guide means and second guide means 56 which can be used as appropriate to move the goods handling system frame 54 in relation to the storage area.

Further to the figures the frame 4 can be utilised as shown in FIG. 2 for the reception of loaded pallets thereon, with any necessary securing or location means provided, or can be provided with a floor upon which goods can be directly loaded. The embodiment to be used is largely dependent upon the type of goods to be loaded and the loading systems used by each individual operator.

It is envisaged that the system will operate with equal advantages in a warehouse environment. The main advantages of the invention are that the system is relatively simple to use Furthermore the system has a minimum of parts and is self contained thereby ensuring that the maximum amount of storage space is available for the storage of goods. This is in contrast to normal moving floor systems which require space in which to accomodate hydraulic lifting equipment and or electrical equipment. The system is considerably more adaptable than existing methods as it allows goods to be directly loaded onto the movable frame with a floor or for pallets carrying said goods to be mounted directly onto the frame.

The flexibility offered by this system both in terms of optimum use of storage space and the method of loading and unloading the goods is the main advantage over existing methods and represents considerable cost and time savings to the goods carrier and the loader of the trailers and trucks.

The creation of split deck flooring enables trailers to be loaded where, previously this would not have been possible. Roll pallets can be fitted on the top deck of the storage area and powered up, and the space below the deck or framecan be filled without the loaders being required to get underneath the decks. This can allow roll pallets of, for example, 1.5 meter dimensions, to be lifted above each other and by using maximum height trailers this method allows for the load size to be doubled. All conventional trailers with two floors require full headroom space to be provided to enable the loaders to access the head space which is typically a minumum of 1.8 meters in each deck. Thus this restricts the method of loading using existing double floor storage areas to very light loads, to operate at limits of under 32 tonnes, where there is no limit, or to restrict the load to 1 level of roll pallets. These restrictions are therefore overcome by the greatly improved adaptability and space usage of the invention.

I claim:

1. A goods support system (52) for use in a goods storage area having a floor, a ceiling and at least a pair of sidewalls, which system comprises:

at least one base (54) mounted on a plurality of first guides (10, 12, 14, 16) forming a first set of guides, said base movable along said first set of guides within the goods storage area;

a set of second guides wherein said base and said first guides are movable within the goods storage area in a perpendicular direction to the movement of said base along the first set of guides;

said first set and second set of guides mounted on or adjacent to said sidewalls, floor or ceiling; and wherein one of the first or second sets of guides are mounted in a substantially vertical plane and the other set of guides is mounted in a substantially horizontal plane.

2. A goods support system according to claim 1 characterized in that said at least one base (54) is movable along the first set of guides (10, 12, 14, 16) and said first set of guides is mounted for movement along said second set of guides (56).

3. A goods support system according to claim 2 characterized in that at least one base (54) is capable of movement within the goods storage area in vertical and horizontal planes along said first and second sets of guides (10, 12, 14, 16, 56).

4. A goods support system according to claim 3 wherein movement of the base (54) in a substantially horizontal direction is achieved by powered drive.

5. A goods support system according to claim 4 characterized in that the base (54) is mounted on the first set of guides (10, 12, 14, 16), said guides having banks of rollers (68) or skates thereon and said rollers or skates are arranged to engage and pass along the second set of guides (56) mounted in a substantially horizontal plane.

6. A goods support system according to claim 5 characterized in that the second set of guides (56) are mounted on the floor of the goods storage area.

7. A goods storage system according to claim 3 characterized in that movement of the base (54) relative to a set of guides (10, 12, 14, 16) arranged in a substantially vertical plane is powered.

8. A goods support system according to claim 7 including drive means (30) to cause said base to rise or lower.

9. A goods support system according to claim 8 characterized in that at least one of said guides (10, 12, 14, 16) includes a hydraulically powered ram mounted within the guide to connect with said base (54) for movement of the same.

10. A goods support system according to claim 8 characterized in that each of the drive means (30) provided for any one base are controllable to drive and move the base (54) at a uniform speed thereby maintaining the base (54) in the desired plane.

11. A goods support system according to claim 8 characterized in that the drive means (30) provided to drive the base along the guide means is provided on the base and connected to the guide means via a central drive shaft to which is linked a series of link shafts (28), each of said link shafts (28) connected for rotatable movement.

12. A goods support system according to claim 11 characterized in that the central shaft is driven by an electric motor (34).

* * * * *